Patented Feb. 16, 1943

2,311,033

UNITED STATES PATENT OFFICE 2,311,033

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application June 4, 1941, Serial No. 396,571

11 Claims. (Cl. 260—205)

This invention relates to new arylazo dye compounds and their application to the coloration of textile materials in the form of threads, yarns, fibers and fabrics. Coloration may be effected by dyeing, printing, stenciling or like methods.

I have discovered that the azo compounds having the general formula:

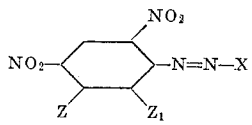

wherein Z and $Z_1$ each represent halogen and X represents the residue of a member selected from the group consisting of an aminobenzene and an aminonaphthalene, constitute a valuable class of dye compounds.

Ordinarily, the coupling components employed in the preparation of the dye compounds of my invention have the general formula:

wherein R represents the residue of a member selected from the group consisting of a benzene and a naphthalene nucleus and $R_1$ and $R_2$ each represent a member selected from the group consisting of hydrogen, an alkyl group, a cycloalkyl group, a benzene nucleus and an unsaturated short chain aliphatic hydrocarbon group whose unsaturation consists of a double bond. Normally the

grouping is in para position to the azo bond.

The nuclear non-sulfonated compounds have been found to be especially of value for the coloration of organic derivative of cellulose textile materials and it is to these compounds and their application for the coloration of such textile materials that my invention is particularly directed. These nuclear non-sulfonated compounds likewise possess some application for the coloration of wool and silk textile materials. Similarly, they can be employed to color cellulose ester lacquers. For the coloration of organic derivatives of cellulose such as cellulose acetate silk, nuclear non-sulfonated dye compounds wherein R is a benzene nucleus are generally advantageous.

The compounds of my invention wherein the coupling component contains a nuclear sulfonic acid group have little or no utility for the coloration of organic derivatives of cellulose but possess application for the coloration of wool and silk. Preferably, when the dye compounds of my invention are to be employed for the coloration of organic derivatives of cellulose, they should contain no nuclear free carboxylic acid group.

It is an object of my invention to provide a new class of azo dye compounds suitable for the coloration of organic derivatives of cellulose, wool and silk. Another object of my invention is to provide a process for the coloration of organic derivatives of cellulose, wool and silk. A further object is to provide colored textile materials which are of good fastness to light and washing. A particular object of my invention is to provide a new class of nuclear non-sulfonated azo dyes suitable for the coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose or benzyl cellulose. While my invention will be illustrated more particularly in connection with the coloration of cellulose acetate silk, a material to which the invention is especially adapted, it will be understood that it applies to the coloration of other organic derivatives of cellulose such as those just named as well as to the coloration of wool and silk.

The azo dye compounds of my invention can be prepared by diazotizing 1-amino-2,4-dinitro-5,6-dihalogen benzenes and coupling the diazonium compounds obtained with the aminobenzene or aminonaphthalene coupling components mentioned hereinbefore. Ordinarily, coupling compounds having the general formula:

wherein R, $R_1$ and $R_2$ have the meaning previously assigned to them are employed. Generally speaking, those compounds wherein $R_1$ is hydrogen or an alkyl group and $R_2$ is a hydroxyalkyl group are advantageous.

The term alkyl, as used herein, includes unsubstituted alkyl groups such as a methyl group, an ethyl group, a propyl group or a butyl group, as well as substituted alkyl groups such as β-hydroxyethyl, β-hydroxypropyl, β,γ-dihydroxypropyl, γ-hydroxypropyl, β-methoxyethyl, β-ethoxyethyl, β-sulfoethyl, γ-sulfopropyl, β-sulfatoethyl, β-phosphatoethyl, γ-phosphatopropyl and the unsubstituted alkyl esters of the hydroxyalkyl groups named, for example. Illustrative cycloalkyl groups include cyclobutyl, cyclohexyl and cycloheptyl. Illustrative of the unsaturated short chain aliphatic hydrocarbon group referred to hereinbefore are allyl and crotonyl.

The nuclei designated by R can be substituted with substituents such as a nitro group, a halogen atom, a hydroxy group, an alkyl group, an alkoxy group, a cyano group, a sulfonamide group, a carboxamide group, a carboxylic acid radical and a sulfonic acid radical, for example.

The following examples illustrate the preparation of the compounds of my invention:

Example 1

A. 25.2 grams of 2,4-dinitro-5,6-dichloroaniline are dissolved in 225 cc. of hot glacial acetic acid and the mixture is then cooled rapidly to room temperature while stirring.

B. 7.6 grams of sodium nitrite are added to 50 cc. of cold sulfuric acid, the resulting mixture is heated to 70° C. and then cooled to 15° C.

The mixture prepared in B is stirred while the mixture prepared in A is added thereto over a period of 30-45 minutes while maintaining a temperature of 15-20° C. Stirring is continued after the addition of the last of the amine mixture prepared in A and then 1 gram of urea is added.

18.1 grams of di-β-hydroxyethylaniline are dissolved in a dilute aqueous hydrochloric acid solution and the resulting solution is cooled to a temperature approximating 0-10° C. The diazo solution prepared as described above is then added with stirring while maintaining the reaction mixture in a cooled condition. The coupling reaction which takes place is completed by adding sodium acetate until the reaction mixture is neutral to Congo red paper following which the dye compound formed is recovered by filtration, washed with water and dried. The dye compound obtained colors cellulose acetate silk, wool and silk violet.

Example 2

25.2 grams of 2,4-dinitro-5,6-dichloroaniline are diazotized as described in Example 1 and the diazonium compound obtained is coupled with 13.7 grams of cresidine. Coupling and recovery of the dye compound formed can be carried out in accordance with the general method described in Example 1. In place of cresidine, another aminobenzene or aminonaphthalene compound such as m-toluidine, m-anisidine, 2,5-dimethoxyaniline, 2,5-diethoxyaniline, α-naphthylamine, 1-amino-5-naphthol and 2,5-dimethylaniline, for example, can be employed. The dyes thus prepared have a free amino group and are capable of further diazotization and coupling with a wide variety of coupling components. The dyes of this example may, for example, be applied to cellulose acetate, diazotized on the fiber and developed with developing components to give blue, black and like colors on the fiber. Suitable development coupling components include 2-hydroxy-3-naphthoic acid, any Naphthol-A. S. compound, 1-phenyl-3-methyl-5-pyrazolone and alkylated aniline compounds such as dimethylaniline and diethylaniline, for example.

Example 3

25.2 grams of 2,4-dinitro-5,6-dichloroaniline are diazotized as described in Example 1 and the diazonium compound obtained is coupled with 16.7 grams of mono-β-hydroxyethyl-o-anisidine. Coupling and recovery of the dye compound formed can be carried out in accordance with the procedure described in Example 1. The dye compound obtained colors cellulose acetate silk violet.

Example 4

25.2 grams of 2,4-dinitro-5,6-dichloroaniline are diazotized and the diazonium compound obtained is coupled with 23.7 grams of butyl glyceryl-m-toluidine. Coupling and recovery of the dye compound formed can be carried out in accordance with the general method described in Example 1. The dye compound obtained colors cellulose acetate silk violet.

Example 5

29.6 grams of 2,4-dinitro-5-chloro-6-bromoaniline are diazotized in accordance with the method described in Example 1. 32 grams of sodium sulfatoglyceryl-α-naphthylamine are dissolved in water and the resulting solution is cooled to 0-10° C. The diazo solution prepared as described above is then added slowly with stirring while maintainining the reaction mixture in a cooled condition. Concurrently with the addition of the diazo solution an aqueous solution of sodium carbonate is added at such a rate that the reaction mixture remains substantially neutral to litmus. Upon completion of the coupling reaction which takes place, the dye compound formed is precipitated by the addition of sodium chloride, recovered by filtration and dried. The dye compound obtained colors cellulose acetate silk, wool and silk blue.

Example 6

The diazo solution of Example 1 is added to a concentrated aqueous solution of 22.3 grams of 1-naphthylamine-5-sulfonic acid and the coupling reaction which takes place is completed by adding sodium bicarbonate following which the dye is precipitated by the addition of sodium chloride, recovered by filtration and dried. Silk and wool are colored blue shades from aqueous solutions of the dye which may contain either salt or acid or both of these materials.

In place of 1-naphthylamine-5-sulfonic acid, there may be substituted 1-naphthylamine-6-sulfonic acid, 1-naphthylamine-3,6,8-trisulfonic acid, 1-cetylnaphthylamine-4,5-disulfonic acid, 1-amino-8-naphthol-2,4-disulfonic acid, 1-dibutylamino-8-naphthol-3,6-disulfonic acid, 1-di-β-hydroxyethylamino-3-sulfonic benzene and 1-(-ethyl-β-hydroxyethyl-)amino-3-sulfonic benzene. All of the dyes thus obtained color wool and silk rubine.

The following tabulation further illustrates the compounds included within the scope of my invention together with the colors they yield on cellulose acetate silk. The compounds indicated below can be prepared by diazotizing the amines listed under the heading "Amine" and coupling the diazonium compounds obtained with the compounds specified in the column entitled "Coupling component." The diazotization and coupling reactions may, for example, be carried out following the general procedure described hereinbefore.

larly, by the substitution of one gram mole of iodine monochloride for bromine in the above example, 1-amino-2,4-dinitro-5-chloro-6-iodobenzene can be obtained.

| Amine | Coupling component | Color |
|---|---|---|
| 1. 2,4-dinitro-5,6-dichloroaniline | Di-β-hydroxyethylaniline | Violet. |
| 2. 2,4-dinitro-5,6-dibromoaniline | ____do____ | Do. |
| 3. 2,4-dinitro-5,6-diiodoaniline | ____do____ | Do. |
| 4. 2,4-dinitro-5,6-difluoroaniline | ____do____ | Do. |
| 5. 2,4-dinitro-5-chloro-6-bromoaniline | ____do____ | Do. |
| 6. 2,4-dinitro-6-chloro-5-bromoaniline | ____do____ | Do. |
| 7. 2,4-dinitro-5-chloro-6-iodoaniline | ____do____ | Do. |
| 8. 2,4-dinitro-6-chloro-5-iodoaniline | ____do____ | Do. |
| 9. 2,4-dinitro-6-chloro-5-fluoroaniline | ____do____ | Do. |
| 10. 2,4-dinitro-5-fluoro-6-bromoaniline | ____do____ | Do. |
| 11. 2,4-dinitro-5-bromo-6-iodoaniline | ____do____ | Do. |
| Amines 1-11 above | (1) 1-(ethyl-,β,γ-dihydroxy-propyl-) amino-3-chloro-benzene. | Red-rubine. |
| Do | (2) 1-(butyl)-, sodium-β-sulfoethyl-) aminobenzene | Violet. |
| Do | (3) 1-di-β-hydroxyethylamino-3-methoxybenzene | Purple. |
| Do | (4) 1-(β-hydroxyethyl-,β,γ-dihydroxypropyl-) amino-3-methoxybenzene. | Do. |
| Do | (5) 1-di-β-hydroxyethylamino-3-methylbenzene | Do. |
| Do | (6) 1-di-β,γ-dihydroxypropyl-amino-3-methylbenzene | Do. |
| Do | (7) 1-(butyl-,β,γ-dihydroxy-propyl)-amino-3-methylbenzene. | Red-blue. |
| Do | (8) 1-(amyl-, ammonium-β-sulfatoethyl)-amino-3-methylbenzene. | Do. |
| Do | (9) 1-mono-β, γ-dihydroxypropylamino-3-methyl-benzene. | Purple. |
| Do | (10) 1-(β-hydroxyethyl-, α-methoxy-β-hydroxypropyl)-amino-2-methoxy-5-methyl-benzene. | Blue. |
| Do | (11) 1-di-β, γ-dihydroxypropyl-amino-2-methoxy-5-methylbenzene. | Do. |
| Do | (12) N-cyclohexylaniline | Violet. |
| Do | (13) 1-di-β-methoxyethylamino-2,5-dimethoxy benzene | Blue. |
| Do | (14) 1-glycerylaminonaphthalene | Do. |
| Do | (15) 1-amino-5-naphthol | Do. |
| Do | (16) Dimethylaniline | Violet. |
| Do | (17) 1-(allyl-, glyceryl-)amino-2-methoxy-5-methyl benzene. | Blue. |
| Do | (18) N-β-hydroxyethyl-diphenyl-amine | Violet. |
| Do | (19) 1-crotonylaminonaphthalene | Blue. |
| Do | (20) 1-monoallylamino-3-methyl-benzene | Violet. |
| Do | (21) 1-(n-propyl-, crotonyl)-aminobenzene | Do. |
| Do | (22) 1-di-β-hydroxyethylamino-naphthalene | Blue. |

Sulfonated coupling components, in addition to those previously mentioned, can be employed in the preparation of azo dye compounds of my invention which are suitable for the coloration of wool and silk. These coupling components can be prepared, for example, by sulfonation of the unsulfonated coupling components disclosed herein. The sulfonation reaction can be carried out by known methods for the introduction of a sulfonic acid group into a benzene or naphthalene nucleus.

It will be understood that the specific dye compounds given hereinbefore are intended to be illustrative and not limitative of the invention. Any of the amines disclosed herein may be diazotized and the diazonium compounds obtained coupled with any of the coupling components shown herein to obtain dye compounds included within the scope of my invention.

In order that the preparation of the azo dye compounds of my invention may be clearly understood, the preparation of various 1-amino-2,4-dinitro-5,6-dihalogen benzene compounds is described or indicated hereinafter.

*Preparation of 1-amino-2,4-dinitro-5-chloro-6-bromobenzene*

One gram mole of 1-amino-2,4-dinitro-5-chlorobenzene is dissolved in acetic acid, following which one gram mole of bromine is added over a period of 1 hour while cooling and stirring. After addition of the bromine, the reaction mixture is stirred at room temperature for 1 hour and then poured into water. The resulting 1-amino-2,4-dinitro-5-chloro-6-bromobenzene formed is recovered by filtration, washed with water and dried.

One gram mole of chlorine can be substituted for bromine in the above example to obtain 1-amino-2,4-dinitro-5,6-dichlorobenzene. Simi- 1-amino-2,4-dinitro-5-bromo-6-chlorobenzene and 1-amino-2,4-dinitro-5-bromo-6-iodobenzene can be prepared by reacting 1-amino-2,4-dinitro-5-bromobenzene with chlorine and iodine monochloride, respectively, in accordance with the process above described.

1-amino-2,4-dinitro-5-iodo-6-bromobenzene, 1-amino-2,4-dinitro-5-iodo-6-chlorobenzene and 1-amino-2,4-dinitro-5,6-diiodobenzene can be prepared by reacting 1-amino-2,4-dinitro-5-iodobenzene with bromine, chlorine and iodine monochloride, respectively, in accordance with the process above described.

1-amino-2,4-dinitro-5-fluoro-6-bromobenzene, 1-amino-2,4-dinitro-5-fluoro-6-chlorobenzene and 1-amino-2,4-dinitro-5-fluoro-6-iodobenzene can be prepared by reacting 1-amino-2,4-dinitro-5-fluorobenzene with bromine, chlorine and iodine monochloride, respectively, in accordance with the process above described.

1-amino-2,4-dinitro-5,6-difluoroaniline can be prepared by nitration of 1-amino-2,3-difluorobenzene in accordance with known nitration methods. 1-amino-2,4-dinitro-5,6-dibromobenzene is disclosed in Beilstein, volume 12, page 762.

Both water soluble and water insoluble azo dye compounds are included within the scope of my invention. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material or materials to be dyed may be added to the dyebath and the dyeing operation conducted in known fashion. For a more complete description as to how the water insoluble azo dye compounds of my invention can be employed for the dyeing of organic derivatives of cellulose, reference may be had to McNally and Dickey U. S. Letters Patent No. 2,115,030, issued April 26, 1938. The water insoluble azo dye compounds of my invention, as previously noted, also possess application for the dyeing of wool and silk and they may be applied to these materials in the same manner as they are applied to organic derivatives of cellulose.

The water soluble dye compounds of my invention may be applied to wool, silk and (depending upon the nature and position of the water-solubilizing group) organic derivatives of cellulose textile materials from an aqueous solution of the dye which may contain a salt such as sodium chloride. These water-soluble dye compounds can be applied to the fiber in substantially the same manner as the water-insoluble dye compounds. In the case of the water-soluble dye compounds, however, the use of a dispersing or solubilizing agent is not necessary although such an agent may be used if desired. It will be understood, of course, that the above remarks concerning the application of the dye compounds of my invention to textile materials are merely illustrative and that any of the customary methods for applying dyes of the character here involved can be employed.

I claim:

1. The azo dye compounds having the general formula:

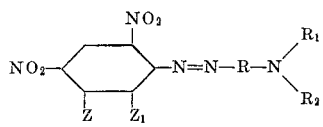

wherein Z and $Z_1$ each represent halogen, R represents the residue of a member selected from the group consisting of a benzene and a naphthalene nucleus and $R_1$ and $R_2$ each represent a member selected from the group consisting of hydrogen, an alkyl group, a cycloalkyl group, a benzene nucleus and an unsaturated short chain aliphatic hydrocarbon group whose unsaturation consists of a double bond.

2. The azo dye compounds having the general formula:

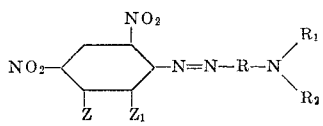

wherein Z and $Z_1$ each represent halogen, R represents the residue of a benzene nucleus, $R_1$ and $R_2$ each represent a member selected from the group consisting of hydrogen, an alkyl group, a cycloalkyl group, a benzene nucleus and an unsaturated short chain aliphatic hydrocarbon group whose unsaturation consists of a double bond and wherein the grouping

is in para position to the azo bond.

3. The azo dye compounds having the general formula:

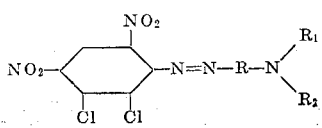

wherein R represents the residue of a member selected from the group consisting of a benzene and a naphthalene nucleus and $R_1$ and $R_2$ each represent a member selected from the group consisting of hydrogen, an alkyl group, a cycloalkyl group, a benzene nucleus and an unsaturated short chain aliphatic hydrocarbon group whose unsaturation consists of a double bond.

4. The azo dye compounds having the general formula:

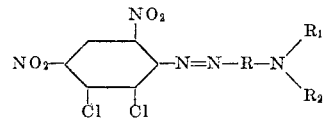

wherein R represents the residue of a benzene nucleus, $R_1$ and $R_2$ each represent a member selected from the group consisting of hydrogen, an alkyl group, a cycloalkyl group, a benzene nucleus and an unsaturated short chain aliphatic hydrocarbon group whose unsaturation consists of a double bond and wherein the grouping

is in para position to the azo bond.

5. The azo dye compounds having the general formula:

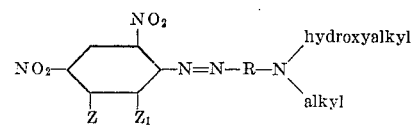

wherein Z and $Z_1$ each represent halogen, R represents the residue of a benzene nucleus and wherein the

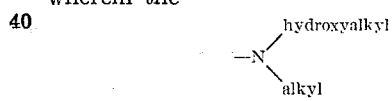

grouping is in para position to the azo bond.

6. The azo dye compounds having the general formula:

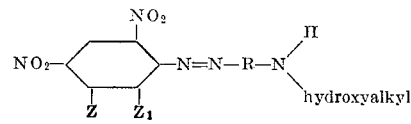

wherein Z and $Z_1$ each represent halogen, R represents the residue of a benzene nucleus and wherein the

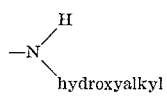

grouping is in para position to the azo bond.

7. The azo dye compound having the formula:

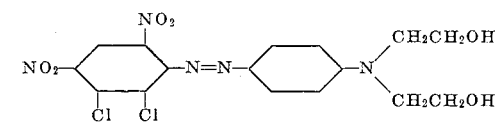

8. The azo dye compound having the formula:

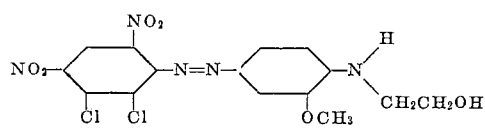

9. An organic derivative of cellulose colored with a nuclear non-sulfonated azo dye compound having the general formula:

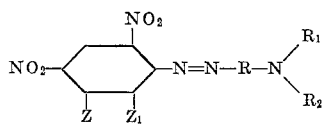

wherein Z and Z₁ each represent halogen, R represents the residue of a benzene nucleus, R₁ and R₂ each represent a member selected from the group consisting of hydrogen, an alkyl group, a cycloalkyl group, a benzene nucleus and an unsaturated short chain aliphatic hydrocarbon group whose unsaturation consists of a double bond and wherein the grouping

is in para position to the azo bond.

10. A cellulose acetate colored with a nuclear non-sulfonated azo dye compound having the general formula:

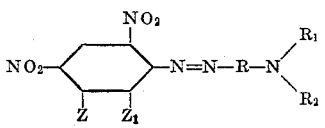

wherein Z and Z₁ each represents halogen, R represents the residue of a benzene nucleus, R₁ and R₂ each represent a member selected from the group consisting of hydrogen, an alkyl group, a cycloalkyl group, a benzene nucleus and an unsaturated short chain aliphatic hydrocarbon group whose unsaturation consists of a double bond and wherein the grouping

is in para position to the azo bond.

11. A textile material colored with an azo dye compound having the formula:

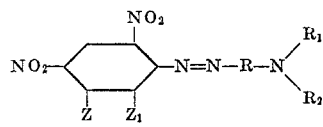

wherein Z and Z₁ each represent halogen, R represents the residue of a member selected from the group consisting of a benzene and a naphthalene nucleus and R₁ and R₂ each represents a member selected from the group consisting of hydrogen, an alkyl group, a cycloalkyl group, a benzene nucleus and an unsaturated short chain aliphatic hydrocarbon group whose unsaturation consists of a double bond.

JOSEPH B. DICKEY.